(12) United States Patent
Roditi et al.

(10) Patent No.: US 8,440,379 B2
(45) Date of Patent: May 14, 2013

(54) LIQUID ELECTROPHOTOGRAPHIC INK HAVING IMPROVED DURABILITY

(75) Inventors: Stella Stolin Roditi, Rehovot (IL); Albert Teishev, Rishon le-zion (IL); Keren Regev, Tel Aviv (IL); Yael Warman, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 12/997,536

(22) PCT Filed: Jun. 10, 2008

(86) PCT No.: PCT/US2008/066425
§ 371 (c)(1),
(2), (4) Date: Feb. 14, 2011

(87) PCT Pub. No.: WO2009/151446
PCT Pub. Date: Dec. 17, 2009

(65) Prior Publication Data
US 2011/0123228 A1 May 26, 2011

(51) Int. Cl.
*G03G 9/13* (2006.01)
(52) U.S. Cl.
USPC .................................... 430/109.1; 430/109.3
(58) Field of Classification Search ............... 430/109.1, 430/109.3
See application file for complete search history.

(56) References Cited

U.S. PATENT DOCUMENTS

| 4,273,849 | A | * | 6/1981 | Merrill et al. ............ 430/119.1 |
| 5,346,796 | A | | 9/1994 | Almog |
| 6,020,098 | A | | 2/2000 | Bretscher et al. |
| 6,075,085 | A | | 6/2000 | Fukuda et al. |
| 6,106,989 | A | | 8/2000 | Bretscher et al. |
| 6,194,106 | B1 | | 2/2001 | Bretscher et al. |
| 6,623,902 | B1 | | 9/2003 | Ben-Avraham et al. |
| 7,078,141 | B2 | | 7/2006 | Ben-Avraham et al. |
| 2002/0137850 | A1 | | 9/2002 | Matzinger |
| 2004/0023143 | A1 | * | 2/2004 | Ben-Avraham et al. ...... 430/114 |
| 2007/0031751 | A1 | | 2/2007 | Teishev et al. |

FOREIGN PATENT DOCUMENTS

| EP | 1180540 | 2/2002 |
| JP | 08-269374 | 10/1996 |
| JP | 2003-313483 | 11/2003 |
| WO | WO 2007/130069 | 11/2007 |

* cited by examiner

*Primary Examiner* — Hoa V Le

(57) ABSTRACT

The present disclosure is drawn to a liquid electrophotographic ink, comprising a carrier liquid, and a pigment-polymer blend composition dispersed in the carrier liquid, the pigment-polymer blend composition comprising a pigment and a polymer blend of three distinct polymers. The polymer blend can comprise a first polymer having a melt flow rate of about 20 to about 70 g/10 min and a Vicat softening point of about 60° C. to about 70° C., a second polymer having a melt flow rate of about 80 to about 120 g/10 min, and a third polymer having an acidity of about 160 to about 230 mg KOH/g and a melt flow rate of at least 500 g/10 min. The liquid electrophotographic ink is typically formulated for printing from a liquid electrophotographic printer.

26 Claims, No Drawings

LIQUID ELECTROPHOTOGRAPHIC INK HAVING IMPROVED DURABILITY

BACKGROUND

Digital printing involves technologies in which a printed image is created directly from digital data, for example using electronic layout and/or desktop publishing programs. Known methods of digital printing include full-color ink-jet printing, electrophotographic printing, laser photo printing, and thermal transfer printing methods.

Electrophotographic printing techniques involve the formation of a latent image on a photoconductor surface mounted on an imaging plate or other surface. In one instance, the photoconductor is first sensitized, usually by charging, and then exposed to light projected through a positive film of the document to be reproduced, resulting in dissipation of the charge in the areas exposed to light. The latent image is subsequently developed into a full image by the attraction of oppositely charged toner particles to the charge remaining on the unexposed areas. For liquid electrophotographic inks, the developed image is transferred from the photoconductor to a hot elastomeric blanket, from which it is transferred to a substrate, such as paper, plastic or other suitable material, by heat or pressure or a combination of both to produce the printed final image.

The latent image can be developed using, either a dry toner (a colorant mixed with a powder carrier) or a liquid ink (a suspension of a pigmented resin in a liquid carrier). The toner or ink generally adheres to the substrate surface with little penetration into the substrate. The quality of the final image is largely related to the size of the particles, with higher resolution provided by smaller particles.

Liquid inks used in liquid electrophotography are generally composed of pigmented thermoplastic resin particles suspended in a non-conducting liquid carrier, generally a saturated hydrocarbon. Offset-preventing and release-facilitating oil, such as silicone oil, is often used to increase the efficiency of ink transfer from the imaging surface. The liquid ink is electrostatically charged and brought into contact with the photoconductor surface to develop the latent image. When transferred to a hot elastomeric blanket and heated, the particles melt and fuse to form a tacky polymer film. When the tacky polymer film comes in contact with a cooler surface, such as a paper substrate, the film hardens and adheres to the substrate and peels away from the blanket, laminating the paper. The ink is deposited onto the substrate essentially dry, and desired print finishing can be performed immediately. Since the ink is transferred completely from the blanket to the substrate, a new layer in a different color can be created for every rotation of the press.

The small particle size used in liquid inks allows the printing of high resolution, high gloss images with sharp edges and very thin image layers. However, due to the fact that the print produced by liquid ink is not absorbed into the paper but is attached to the paper surface by adhesive attraction, the print may be prone to damage by scratching, peeling, or flaking. As such, improved electrophotographic inks continue to be sought through ongoing developmental and research efforts.

DETAILED DESCRIPTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "carrier liquid," "carrier," or "carrier vehicle" refers to the fluid in which the colorant of the present invention can be dispersed to form a liquid electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "liquid electrophotographic ink" generally refers to an ink having a carrier liquid, a resin based colorant and a charging component. In accordance with certain embodiments of the present invention said resin contains certain polymers, in some embodiments, certain copolymers.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "copolymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g., 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art.

As used herein, "acidity," "acid number," or "acid value" refers to the mass of potassium hydroxide (KOH) in milligrams that is required to neutralize one gram of a substance.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa·s, as known in the art.

As used here, "Vicat softening point" refers to the temperature at which a flat-ended needle penetrates a polymer to the depth of 1 mm under a specific load as outlined in ASTM D1525. The temperature reflects the point of softening to be expected when a material is used in an elevated temperature application.

As used herein, "incompatible wax" refers to a wax that is incompatible with the polymer blend. Specifically, the wax phase separates from the polymer blend phase upon the cooling of the polymer fused mixture on the substrate during and after the transfer of the ink film from the blanket.

As used herein, "electrophotographic printing" generally refers to the process that provides an image that is transferred from a photo imaging substrate either directly or indirectly via an intermediate transfer member. As such, the image is not substantially absorbed into the substrate on which it is applied. Additionally, "electrophotographic printers" generally refer to those printers capable of performing electrophotographic printing, as described above.

"Liquid electrophotographic printing" is a specific type of electrophotographic printing where a liquid ink is employed in the electrophotographic process rather than a powder toner.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop a liquid electrophotographic ink having improved durability. In accordance with this, the present disclosure is drawn to compositions and methods having a pigmented resin dispersed in a carrier liquid, said resin comprises a mixture of at least three polymers for use in an electrophotographic ink. It is noted that when discussing a liquid electrophotographic ink or a method of formulating such a liquid electrophotographic ink, each of these discussions can be considered applicable to each of these embodiments, whether or not they are explicitly discussed in the context of that embodiment. Thus, for example, in discussing a first polymer incorporated into a polymer blend for a liquid electrophotographic ink, such a first polymer can also be used in a method of manufacturing such a liquid electrophotographic ink, and vice versa.

As such, with these definitions in mind, a liquid electrophotographic ink can comprise a carrier liquid and a pigment-polymer composition dispersed in the carrier liquid. The pigment-polymer composition can comprise a pigment and a polymer blend of three distinct polymers, where the polymer blend comprises a first polymer having a melt flow rate of about 20 to about 70 g/10 minutes and a Vicat softening point of about 60° C. to about 70° C., a second polymer having a melt flow rate of about 80 g/10 minutes to about 120 g/10 minutes, and a third polymer having an acidity of about 160 mg KOH/g and a melt flow rate of at least 500 g/10 minutes. Additionally, the liquid electrophotographic ink can be formulated for printing in a liquid electrophotographic printer. Such a formulation may include adding additional components to the ink to make the ink compatible with liquid electrophotographic printing. For example, the liquid electrophotographic ink may further comprise a charge director, may have a certain viscosity, or may have a certain charge conductivity, etc.

The present disclosure also provides a method of manufacturing a liquid electrophotographic ink having improved durability, comprising forming a polymer blend by processing a carrier liquid and three distinct polymers. The polymer blend can comprise i) a first polymer having a melt flow rate of about 20 to about 70 g/10 min and a Vicat softening point of about 60° C. to about 70° C., ii) a second polymer having a melt flow rate of about 80 to about 120 g/10 min, and iii) a third polymer having an acidity of about 160 to about 230 mg KOH/g and a melt flow rate of at least 500 g/10 minutes. Additional steps include processing the polymer blend with a pigment and charge director to form a liquid electrophotographic ink such that the liquid electrophotographic ink is capable of being printed from a liquid electrophotographic printer.

Additionally, a method of printing a liquid electrophotographic ink having improved durability can comprise printing any liquid electrophotographic ink as described herein on a substrate, such as a substrate which includes paper, using a liquid electrophotographic printer.

The present compositions and methods unexpectedly provide a more durable liquid electrophotographic ink having an improved scratch resistance. Without intending to be bound by any particular theory, the present liquid electrophotographic inks provide durability and scratch resistance by selecting a combination of polymers that provide durability as well as adhesion. Specifically, the liquid electrophotographic inks described herein can have a first, second, and third polymer that have specific physical properties. In one embodiment, a first polymer can have a melt flow rate of about 20 to about 70 g/10 minutes and a Vicat softening point of about 60° C. to about 70° C. In another embodiment, the first polymer can have an acidity of about 90 to about 130 mg KOH/g. In one embodiment, a second polymer can have melt flow rate of about 80 to about 120 g/10 minutes. In another embodiment, the second polymer can have an acidity of about 50 to about 80 mg KOH/g. Additionally, the second polymer can have a Vicat softening point of about 60° C. to about 70° C. In one embodiment, the third polymer can have a melt flow rate of at least 500 g/10 minutes and an acidity of about 160 to about 230 mg KOH/g. Additionally, the third polymer can have a melt viscosity lower than 1000 cP.

Additionally, such characteristics can be combined to describe additional embodiments, e.g., a first polymer having a melt flow rate of about 20 to about 70 g/10 minutes and an acidity of about 90 to about 130 mg KOH/g or a polymer blend comprising a first polymer having an acidity of about 90 to about 130 mg KOH/g and a second polymer having a Vicat softening point of about 60° C. to about 70° C., etc. In another embodiment, the liquid electrophotographic inks can have polymers and/or copolymers in addition to the three distinct polymers, as known in the art, including those described herein. In one embodiment, the polymer blend can further comprise a wax that is incompatible with the polymer blend. Such incompatible waxes are known in the art. As such, the wax can be polyethylene, oxidized polyethylene, polyolefins including blends thereof, and/or mixtures thereof. In one embodiment, instead of the incompatible wax, the electrophotographic inks described herein can further comprise about 2 to about 20 micron size particles of polytetrafluoroethylene.

In one embodiment, the polymers (first and/or second) can be selected from resins such as ethylene-vinyl acetate (EVA) copolymers; copolymers of ethylene and an ethylenically unsaturated acid of either acrylic acid and methacrylic acid; copolymers of ethylene, acrylic or methacrylic acid/alkyl ester of methacrylic or acrylic acid; polyethylene; polystyrene; crystalline polypropylene; ethylene ethyl acrylate; ethylene methacrylic acid copolymers which are partially neutralized with metal ions (e.g. Zn, Na, Li) such as SURLYN® ionomers; acid modified ethylene vinyl acetate terpolymer or blends thereof; polyesters; polyvinyl toluene; polyamides; styrene/butadiene copolymers; combinations thereof; and blends thereof. In one embodiment, the polymers (first and/or second) can be copolymers of ethylene and an ethylenically unsaturated acid of either acrylic or methacrylic acid; an ionomer of ethylene methacrylic acid copolymer; an ester of ethylene methacrylic acid copolymer and an acid modified ethylene vinyl acetate terpolymer; combinations thereof; and/or blends thereof. In another embodiment, the polymers (first and/or second) can be a copolymer of ethylene and an ethylenically unsaturated acid of either acrylic or methacrylic acid. In one embodiment, the first polymer can be a NUCREL® polymer, such as NUCREL® 925, NUCREL® 2906, NUCREL® 2806, or NUCREL® 960. In another embodiment, the second polymer can be a NUCREL® polymer, such as NUCREL® 699 or NUCREL® 599.

Additionally, the first polymer can be a copolymer of ethylene and an ethylenically unsaturated acid of either acrylic or methacrylic acid where the ethylenically unsaturated acid of either acrylic or methacrylic acid can be from 10 wt % to about 20 wt % of the copolymer. In another embodiment, the second polymer can be a copolymer of ethylene and an ethylenically unsaturated acid of either acrylic or methacrylic acid where the ethylenically unsaturated acid of either acrylic or methacrylic acid can be from 7 wt % to about 12 wt % of the copolymer.

The third polymer can be copolymers of ethylene acrylic acid; acid modified polyethylene low molecular weight polymers; maleic anhydride modified polyethylene; and/or mixtures thereof. In one embodiment, the third polymer can be a copolymer of ethylene acrylic acid. In another embodiment, the third polymer can be a Honeywell polymer such as A-C® 5180 (ethylene acrylic acid copolymer), A-C 430® (ethylene vinyl acetate copolymer), or A-C 6702® (oxidized polyethylene).

Additionally, the electrophotographic inks described herein can contain varying amounts of polymers. The following wt % s are expressed as a wt % of the total amount of solids present in the ink. In one embodiment, a first copolymer can be present in the ink from about 60 wt %/solids to about 90 wt %/solids. In another embodiment, the first copolymer can be present in the ink from about 70 wt %/solids to about 80 wt %/solids. Additionally, a second copolymer can be present in the ink from about 5 wt %/solids to about 30 wt %/solids. In one embodiment, the second copolymer can be present in the ink from about 10 wt %/solids to about 20 wt %/solids. Additionally, a third polymer can be present in the ink from about 5 wt %/solids to about 25 wt %/solids. In one embodiment, the third polymer can be present in the ink from about 10 wt %/solids to about 20 wt %/solids.

In one embodiment, the ratio of the first polymer to the second polymer can be from about 10:1 to about 2:1. In another embodiment, the ratio can be from about 6:1 to about 3:1. The ratio of the second polymer to the third polymer can be from about 3:1 to about 1:3.

In one embodiment of the present disclosure, the polymers of the liquid electrophotographic inks can contain acid groups. Without being bound by any particular theory, such a combination of polymers may further improve the durability and scratch resistance of the liquid electrophotographic inks by hydrogen bonding between the carboxylic oxygen of the acid group on one polymer with the acidic proton of the acid group of an adjacent polymer. As such, in one embodiment, the first, second, and third polymers can contain at least one acidic group.

The scratch resistance of the present liquid electrophotographic inks can be improved by an order of magnitude (10 times) over a comparative ink that has the same components of the liquid electrophotographic ink except for the polymer blend. Such an order of magnitude can be quantitatively expressed through scratch resistant tests as known in the art, including those exemplified in the present application. As such, the scratch resistance of the present liquid electrophotographic inks can by improved over comparative inks, which can be expressed by comparing the weight of ink lost after performing a scratch test, as described herein, of the present electrophotographic inks and comparative inks or by comparing the area of ink lost after performing a peel test, as described herein, of the present electrophotographic inks and comparative inks. In one embodiment, the present electrophotographic inks can provide a scratch resistance of twice (two times) that of a comparative ink, as described herein. Such a scratch resistance factor can be measured by the difference in the amount of the ink lost after a scratch resistant test, such as the present scratch resistant test described herein, between the present LEP inks and comparative inks. For example, the present inks can have improved durability where the ink provides an improved scratch resistance 10 times higher than a comparative ink not having the polymer blend, measured by the difference in the amount of the ink lost after a scratch resistant test between the liquid electrophotographic ink and the comparative ink using a Taber Shear/Scratch Tester, Model 551, Mettler Toledo Microbalance, Model MT/UMT. In another embodiment, the present electrophotographic inks can provide a scratch resistance of 3 times, 5 times, 10 times, or higher.

Generally, the carrier liquid acts as a dispersing medium for the other components in the liquid electrophotographic ink. For example, the carrier liquid can be a hydrocarbon, silicone oil, vegetable oil, etc. As such, the carrier liquid can be hydrocarbon-based carrier. Generally, the carrier liquids used for the inks of the present disclosure can be substantially similar to carriers used in prior art liquid electrophotography inks. Generally such inks include at least one aliphatic hydrocarbon, such as paraffins and isoparaffins. As such, carrier liquids can comprise, or substantially comprise, or even essentially consist of isoparaffins, such as or equivalent to the ISOPAR® high-purity isoparaffinic solvents with narrow boiling ranges marketed by Exxon Mobil Corporation (Fairfax, Va., USA). Also suitable as carrier liquids or components of carrier liquids for implementing embodiments of the present disclosure are alkanes having from about 6 to about 14 carbon atoms such as solvents sold under the NORPAR® (NORPAR® 12, 13 and 15) tradename available from Exxon Mobil Corporation (Fairfax, Va., USA). Other hydrocarbons for use as carrier liquids or vehicle components are sold under the AMSCO® (AMSCO® 460 and OMS) tradename available from American Mineral Spirits Company (New York, N.Y., USA), under the SOLTROL® tradename available from Chevron Phillips Chemical Company LLC (The Woodlands, Tex., USA) and under the SHELLSOL® tradename available from Shell Chemicals Limited (London, UK). Such carrier liquids and vehicle components have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, high interfacial tension, low latent heat of vaporization and low photochemical reactivity.

The pigments dispersed in the carrier liquid can be any pigment compatible with the carrier liquid and useful for electrophotographic printing. For example, the pigment may be present as pigment particles, or may comprise a resin (in addition to the polymers described herein) and a pigment. The resins and pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3G, CROMOPHTHAL® YELLOW GR, CROMOPHTHAL® YELLOW 8G, IRGAZINE® YELLOW SGT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 6901F, HELIOGEN® BLUE TBD 7010, HELIOGEN® BLUE K 7090, HELIOGEN® BLUE L 7101F, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200

The charge director can be added to the carrier liquid in order to maintain sufficient electrostatic charge on the ink particles. For example, the charge components can be nanoparticles of a simple salt and a sulfosuccinate salt of the general formula MAn, wherein M is a metal, n is the valence of M, and A is an ion of the general formula [R1—O—C(O)CH2CH(SO3OC(O)—O—R2] where each of R1 and R2 is an alkyl group, or other charge component as found in WO2007130069. Additionally, charge director compounds include ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director used herein can be any as known in the art such as described in U.S. Pat. No. 5,346,796.

EXAMPLES

The following examples illustrate embodiments of the disclosure that are presently known. Thus, these examples should not be considered as limitations of the present disclosure, but are merely in place to teach how to make compositions of the present disclosure. As such, a representative number of compositions and their method of manufacture are disclosed herein.

Example 1

Preparation of a Scratch Resistant Liquid Electrophotographic (LEP) Ink

Preparation of LEP Inks can be Prepared Using the Methods as Outlined in U.S. Patent Publication 20060194138

First, 650 grams of polyethylene-methacrylic acid copolymer (NUCREL® 960, Dupont), 140 grams of polyethylene-acrylic acid copolymer (A-C® 5180, Honeywell) and 140 grams of polyethylene-methacrylic acid copolymer (NUCREL® 699, DuPont) are mixed in a Ross double planetary mixer with 1750 grams of ISOPAR® L (an iso-parafinic oil manufactured by Exxon) carrier liquid at a speed of 60 rpm and a temperature of 130° C. for one hour. The temperature is then reduced and mixing is continued until the mixture reaches room temperature.

During mixing, the polymers solvate in Isopar, and during cooling, granules of polymer mixture (with solvated carrier liquid) in carrier liquid are produced.

Second, 1500 grams of the mixture produced in the first step is charged into a Union Process 1S ball attritor together with 65 grams of pigment, and 700 more grams of ISOPAR® L. In addition, a charge adjuvant and other particulate additives are added in a quantity ranging from 0.001% to 5% by weight of the ink. The mixture is ground for 2 hours at 57° C., followed by grinding for 10 hours at 36° C., until a toner concentrate comprising a toner particles dispersion incorporating the resin and pigments is produced.

Finally, this toner concentrate is diluted with additional ISOPAR® L to produce a toner having a 2% to 3% non-volatile solids (NVS) and charged utilizing 6 mg/grams solids of charge director.

Example 2

Peeling Damage of Various LEP Inks

Various colored inks were prepared in accordance with the steps as outlined in Example 1. Specifically, a black, cyan, and magenta ink was prepared and tested for adhesion to substrate using a 180° angle Peeling test. Generally, peeling tests evaluate adhesion of ink to substrate using pressure sensitive adhesive tape. Generally, a strip of adhesive tape is applied on heavy (≧100%) coverage freshly printed images and then removed. Damage to the image characterizes the extent of adhesion between the image and the paper.

Specifically, the present ink was evaluated using the following procedures. First, 6 copies of 100% ink coverage on various substrates were individually prepared for individual 10 minute and 60 minute tests. The 10 minute test refers to the present peel test that is performed 10 minutes after the ink is printed on the substrate, and the 60 minute test refers to the present peel test that is performed 60 minutes after the ink is printed on the substrate. Six inches of standard adhesive tape (3M 230, 1 inch wide) were placed over the printed ink and a standard (2 Kg Rubber covered) roller was rolled over the tape 5 times back and forth. Six printed images were tested. The procedure was followed for the 60 minute test as well. After, the appropriate time (10 or 60 minutes) the tape was removed and the resulting substrate was analyzed using specially designed software which measured the percentage of ink-free area created after removal of the ink from the substrate by the adhesive tape. The following tables provide the results of the 10 minute and 60 minute peel tests for each ink; performed on various substrates.

TABLE 1

Black Ink 10 minute Peeling Test

| Substrate | Black Ink 10 Minute Peeling Test on # Sheets (% ink left on substrate) | | | | | | Average (% ink left) |
|---|---|---|---|---|---|---|---|
| | #1 | #2 | #3 | #4 | #5 | #6 | |
| Euroart Gloss 135 | 98.9 | 96.5 | 99.8 | 98.8 | 99.3 | 96.4 | 98.3 |
| Productolight 80# | 77.5 | 86.0 | 86.2 | 79.3 | 73.1 | 81.8 | 80.6 |
| Condat Gloss 170 | 99.8 | 99.7 | 99.5 | 99.8 | 99.5 | 99.8 | 99.7 |
| Hello Gloss 130 | 58.7 | 65.2 | 68.6 | 69.8 | — | 61.3 | 64.7 |
| Multifine 130 | 84.1 | 83.5 | 82.4 | 82.2 | 84.1 | 82.0 | 83.0 |
| Tauro 120 | 87.9 | 88.5 | 87.6 | 87.8 | 85.4 | 84.9 | 87.0 |
| Munkin | 67.7 | 71.9 | 70.7 | 71.9 | 70.7 | — | 70.6 |
| Amber Graphic 140 | 78.0 | 71.2 | 70.6 | 73.0 | 72.9 | 71.0 | 72.8 |

TABLE 2

Black Ink 60 minute Peeling Test

| Substrate | Black Ink 60 Minute Peeling Test on # Sheets (% ink left on substrate) | | | | | | Average (% ink left) |
|---|---|---|---|---|---|---|---|
| | #1 | #2 | #3 | #4 | #5 | #6 | |
| Euroart Gloss 135 | 99.9 | 100.0 | 99.7 | 99.7 | 99.6 | 98.0 | 99.5 |
| Productolight 80# | 81.7 | 88.5 | 84.3 | 88.1 | 84.1 | — | 85.4 |
| Condat Gloss 170 | 99.9 | 99.8 | 99.7 | 99.8 | 99.9 | 99.8 | 99.8 |
| Hello Gloss 130 | 73.6 | 80.2 | 74.2 | 70.1 | — | 73.6 | 74.4 |
| Multifine 130 | 85.9 | 88.1 | 84.9 | 87.0 | 82.1 | 79.0 | 84.5 |
| Tauro 120 | 87.7 | 89.2 | 88.9 | 90.6 | 87.6 | 88.8 | 88.8 |
| Munkin | 70.4 | 70.6 | 72.2 | 70.9 | 70.6 | — | 71.0 |
| Amber Graphic 140 | 77.2 | 77.3 | 78.0 | 81.8 | 76.4 | 77.4 | 78.0 |

Example 3

Preparation of a Comparative Liquid Electrophotographic (LEP) Ink

A comparative LEP ink is prepared using the procedures of Example 1, except that 740 grams of polyethylene-methacrylic acid copolymer (NUCREL®, 699, Dupont) and 180 grams of polyethylene-acrylic acid copolymer (A-C® 5120, Honeywell) are mixed, then ground with same pigment, diluted and charged.

Example 4

Peeling Damage (% of Image Remained) of Comparative LEP Inks

The following tables provide the results of the 10 minute and 60 minute peel tests for each comparative ink (black, cyan, and magenta) as prepared in accordance with Example 3; performed on various substrates using the procedures as outlined in Example 2.

TABLE 3

Comparative Black Ink 10 minute Peeling Test

| Substrate | Comparative Black Ink 10 Minute Peeling Test on # Sheets (% ink left on substrate) | | | | | | Average (% ink left) |
|---|---|---|---|---|---|---|---|
| | #1 | #2 | #3 | #4 | #5 | #6 | |
| Euroart Gloss 135 | 96.7 | 90.7 | 92.2 | 93.3 | 94.5 | 91.3 | 93.1 |
| Productolight 80# | 55.6 | 55.2 | 59.6 | 55.1 | 52.3 | 54.8 | 55.4 |
| Condat Gloss 170 | 99.6 | 99.0 | 98.9 | 99.5 | 99.0 | 98.8 | 99.1 |
| Hello Gloss 130 | 50.8 | 47.0 | 44.0 | 46.5 | 47.1 | 49.9 | 47.6 |
| Multifine 130 | 62.7 | 61.9 | 62.0 | 61.0 | 61.4 | 65.8 | 62.5 |
| Tauro 120 | 72.5 | 71.0 | 70.4 | 67.8 | 69.4 | 70.9 | 70.3 |
| Munkin | 57.2 | 60.0 | 62.6 | 59.3 | 62.5 | 58.8 | 60.1 |
| Amber Graphic 140 | 64.7 | 66.0 | 65.0 | 0.0 | 66.5 | 69.5 | 55.3 |

TABLE 4

Comparative Black Ink 60 minute Peeling Test

| Substrate | Comparative Black Ink 60 Minute Peeling Test on # Sheets (% ink left on substrate) | | | | | | Average (% ink left) |
|---|---|---|---|---|---|---|---|
| | #1 | #2 | #3 | #4 | #5 | #6 | |
| Euroart Gloss 135 | 84.6 | 84.6 | 87.6 | 89.0 | 83.4 | 89.2 | 86.4 |
| Productolight 80# | 54.3 | 55.9 | 51.6 | 58.0 | 57.5 | 55.6 | 55.5 |
| Condat Gloss 170 | 0.0 | 100.0 | 99.9 | 99.9 | 99.7 | 100.0 | 83.3 |
| Hello Gloss 130 | 50.9 | 57.3 | 52.4 | 52.7 | 46.7 | 51.0 | 51.8 |
| Multifine 130 | 62.5 | 62.8 | 62.2 | 61.7 | 63.6 | 60.7 | 62.3 |
| Tauro 120 | 70.9 | 67.9 | 70.5 | 67.7 | 70.1 | 69.7 | 69.5 |
| Munkin | 61.1 | 56.2 | 57.6 | 57.3 | 58.6 | 59.1 | 58.3 |
| Amber Graphic 140 | 63.8 | 67.5 | 68.8 | 64.2 | 66.2 | 65.3 | 65.9 |

Example 5

Peeling Damage Comparison between the Scratch Resistant LEP Inks and the Comparative LEP Inks The results of the peeling tests of the present LEP inks with comparative LEP inks are shown in Tables 5 and 6 below. Specifically, the scratch resistant LEP ink of Examples 1 and 2 comprise a first ethylene/methacrylic acid copolymer (NUCREL® 960) having an acidity of 105 mg KOH/g, a melt flow rate of 60, and a Vicat softening point of 62° C.; a second ethylene/methacrylic acid polymer (NUCREL® 699) having an acidity of 80 mg KOH/g, a melt flow rate of 95, and a Vicat softening point of 65° C.; and a third ethylene/acrylic acid copolymer (Honeywell A-C® 5180) having an acidity of 180 mg KOH/g, and a melt viscosity greater than 1000 cps. The comparative LEP ink of Example 3 and 4 comprise a first ethylene/acrylate acid copolymer (NUCREL® 699) having an acidity of 80 mg KOH/g, a melt flow rate of 95, and a Vicat softening point of 65° C. and a second ethylene/acrylic acid copolymer (Honeywell A-C®5120) having an acidity of 120 mg KOH/g and a melt viscosity of 650 cps @ 140 C. As such, the inks of the present disclosure having a specific polymer blend can be distinguished over inks that have a similar polymer blend. Specifically, the inks of the present disclosure can have a combination of polymers that have specific acidity, melt flow rate, Vicat softening point, and/or melt viscosity that enhance scratch resistance and durability as compared to a similar polymer blends from comparative inks.

Tables 5 and 6 show the comparison between the scratch resistant LEP ink (K, C, and M) from Examples 1 and 2 and the comparative ink (Comp K, Comp C, and Comp M) from Examples 3 and 4 by various substrates for 10 minute and 60 minute peeling tests.

TABLE 5

Inks 10 Minute Peeling Test

| Substrate | Inks 10 Minute Peeling Test (average % ink left on substrate) | | | | | | Average Increase (% ink left) |
|---|---|---|---|---|---|---|---|
| | K | Comp K | C | Comp C | M | Comp M | |
| Euroart Gloss 135 | 98.3 | 93.1 | 97.3 | 98.6 | 98.9 | 99.2 | 1.2 |
| Productolight 80# | 80.6 | 55.4 | 75.9 | 70.9 | 80.9 | 71.8 | 13.1 |
| Condat Gloss 170 | 99.7 | 99.1 | 99.8 | 99.8 | 99.8 | 99.9 | 0.2 |
| Hello Gloss 130 | 64.7 | 47.6 | 66.2 | 59.4 | 73.2 | 58.0 | 13.0 |
| Multifine 130 | 83.0 | 62.5 | 74.5 | 69.3 | 77.4 | 68.3 | 11.6 |
| Tauro 120 | 87.0 | 70.3 | 74.4 | 76.0 | 76.6 | 74.7 | 5.7 |
| Munkin | 70.6 | 60.1 | 64.6 | 67.2 | 67.5 | 67.0 | 2.8 |
| Amber Graphic 140 | 72.8 | 55.3 | 67.2 | 48.9 | 67.8 | 22.0 | 27.2 |

K refers to Black,
C refers to Cyan, and
M refers to Magenta

TABLE 6

Inks 60 Minute Peeling Test

| Substrate | Inks 60 Minute Peeling Test (average % ink left on substrate) | | | | | | Average Increase (% ink left) |
|---|---|---|---|---|---|---|---|
| | K | Comp K | C | Comp C | M | Comp M | |
| Euroart Gloss 135 | 99.5 | 86.4 | 98.1 | 96.5 | 99.3 | 98.5 | 5.2 |
| Productolight 80# | 85.4 | 55.5 | 79.5 | 69.6 | 85.2 | 69.2 | 27.9 |
| Condat Gloss 170 | 99.8 | 83.3 | 99.4 | 66.6 | 99.9 | 66.7 | 27.5 |
| Hello Gloss 130 | 74.4 | 51.8 | 75.1 | 62.8 | 82.0 | 63.8 | 17.7 |
| Multifine 130 | 84.5 | 62.3 | 74.4 | 69.2 | 75.7 | 67.3 | 11.9 |
| Tauro 120 | 88.8 | 69.5 | 78.5 | 75.3 | 77.8 | 72.7 | 9.2 |
| Munkin | 71.0 | 58.3 | 69.4 | 64.1 | 70.2 | 64.4 | 7.9 |
| Amber Graphic 140 | 78.0 | 65.9 | 72.2 | 47.8 | 72.0 | 35.3 | 24.4 |

K refers to Black,
C refers to Cyan, and
M refers to Magenta

As shown in Tables 5 and 6, the present scratch resistant inks provided significant improvement over the comparative inks. Improvement can be seen for each type of substrate as well as each ink type. Specifically, the average increase was calculated as an average of the % ink increase between the black, cyan, and magenta inks as compared to comparative (comp) black, cyan, and magenta inks, respectively.

Example 6

Scratch Resistance Test for the Scratch Resistant LEP Inks and the Comparative LEP Inks The scratch resistant Cyan LEP ink of Examples 1 and 2 and the comparative Cyan LEP ink of Examples 3 and 4 were measured for scratch resistance using a Taber Shear/Scratch Tester, Model 551, Mettler Toledo Microbalance, Model MT/UMT. Generally, a moving test specimen was exposed to mechanical intrusion of a cutting tool at well defined conditions. The degree of the damage caused by the intrusion was assessed by weighing ink debris removed from the substrate. The method parameters used were as follows: a cutting tool of S-20 Tungsten Carbide, one rotation with 3 repetitions, 400% coverage, and a load of 50 g. Generally, two scratch tests were performed per image with two images tested. The following table provides the results of the scratch resistant test:

TABLE 7

Comparative Data

| Substrate | Scratch Resistant LEP Inks (Ink scratched off in µg) | Comparative LEP Inks (Ink scratched off in µg) | Difference (µg) |
|---|---|---|---|
| Euroart Gloss 135 gsm | 25 | 373 | 348 |
| Magnostar Gloss 135 gsm | 109 | 459 | 350 |
| UPM Gloss 135 gsm | 46 | 393 | 347 |
| Condat Gloss 135 gsm | 74 | 453 | 379 |
| Multifine 130 gsm | 18 | 102 | 84 |

The results show that the present LEP ink offer considerable scratch resistance compared to the comparative LEP ink. Improvement can be seen for each type of substrate. Specifically, the present ink can provide a scratch resistance 10× or higher than provided by a comparative ink, e.g., Euroart Gloss 135 gsm compare 25 µg for the present LEP ink vs. 373 µg for the comparative ink.

While the invention has been described with reference to certain embodiments, those skilled in the art will appreciate that various modifications, changes, omissions, and substitutions can be made without departing from the spirit of the disclosure. It is intended, therefore, that the invention be limited only by the scope of the following claims.

What is claimed is:

1. A liquid electrophotographic ink, comprising:
   a) a carrier liquid, and
   b) a pigment-polymer blend composition dispersed in the carrier liquid, the pigment-polymer blend composition comprising a pigment and a polymer blend of at least three distinct polymers, the polymer blend comprising:
      i) a first polymer having a melt flow rate of about 20 to about 70 g/10 min and a Vicat softening point of about 60° C. to about 70° C.,
      ii) a second polymer having a melt flow rate of about 80 to about 120 g/10 min, and
      iii) a third polymer having an acidity of about 160 to about 230 mg KOH/g and a melt flow rate of at least 500 g/10 min,
   wherein the liquid electrophotographic ink is formulated for printing in a liquid electrophotographic printer.

2. The liquid electrophotographic ink of claim 1, wherein the polymer blend further comprises an incompatible wax.

3. The liquid electrophotographic ink of claim 2, wherein the wax is selected from the group consisting of polyethylene, oxidized polyethylene, polyolefins including blends thereof, and mixtures thereof.

4. The liquid electrophotographic ink of claim 1, wherein the polymer blend further comprises about 2 to about 20 micron particles of polytetrafluoroethylene.

5. The liquid electrophotographic ink of claim 1, wherein the first polymer has an acidity of about 90 to about 130 mg KOH/g.

6. The liquid electrophotographic ink of claim 1, wherein the first polymer is selected from the group consisting of ethylene-vinyl acetate (EVA) copolymers; copolymers of ethylene and an ethylenically unsaturated acid of either acrylic acid and methacrylic acid; copolymers of ethylene, acrylic or methacrylic acid/alkyl ester of methacrylic or acrylic acid; polyethylene; polystyrene; crystalline polypropylene; ethylene ethyl acrylate; ethylene methacrylic acid copolymers which are partially neutralized with metal ions; acid modified ethylene vinyl acetate terpolymer or blends thereof; polyesters; polyvinyl toluene; polyamides; styrene/butadiene copolymers; combinations thereof; and blends thereof.

7. The liquid electrophotographic ink of claim 1, wherein the first polymer is selected from the group consisting of copolymers of ethylene and an ethylenically unsaturated acid of either acrylic or methacrylic acid; an ionomer of ethylene methacrylic acid copolymer; an ester of ethylene methacrylic acid copolymer and an acid modified ethylene vinyl acetate terpolymer; combinations thereof; and blends thereof.

8. The liquid electrophotographic ink of claim 1, wherein the first polymer is a copolymer of an ethylene and an ethylenically unsaturated acid of either acrylic or methacrylic acid.

9. The liquid electrophotographic ink of claim 8, wherein the ethylenically unsaturated acid of either acrylic or methacrylic acid comprises about 10 wt % to about 20 wt % of the copolymer.

10. The liquid electrophotographic ink of claim 1, wherein the second polymer has an acidity of about 50 to about 80 mg KOH/g and a Vicat softening point of about 60° C. to about 70° C.

11. The liquid electrophotographic ink of claim 1, wherein the second polymer is selected from resins such as ethylene-vinyl acetate (EVA) copolymers; copolymers of ethylene and an ethylenically unsaturated acid of either acrylic acid and methacrylic acid; copolymers of ethylene, acrylic or methacrylic acid/alkyl ester of methacrylic or acrylic acid; polyethylene; polystyrene; crystalline polypropylene; ethylene ethyl acrylate; ethylene methacrylic acid copolymers which are partially neutralized with metal ions; acid modified ethylene vinyl acetate terpolymer or blends thereof; polyesters; polyvinyl toluene; polyamides; styrene/butadiene copolymers; combinations thereof; and blends thereof.

12. The liquid electrophotographic ink of claim 1, wherein the second polymer is selected from the group consisting of copolymers of ethylene and an ethylenically unsaturated acid of either acrylic or methacrylic acid; an ionomer of ethylene methacrylic acid copolymer; an ester of ethylene methacrylic acid copolymer and an acid modified ethylene vinyl acetate terpolymer; combinations thereof; and blends thereof.

13. The liquid electrophotographic ink of claim 1, wherein the second polymer is a copolymer of ethylene and an ethylenically unsaturated acid of either acrylic or methacrylic acid.

14. The liquid electrophotographic ink of claim 8, wherein the ethylenically unsaturated acid of either acrylic or methacrylic acid comprises about 7 wt % to about 12 wt % of the copolymer.

15. The liquid electrophotographic ink of claim 1, wherein the third polymer has a melt viscosity lower than 1000 cps.

16. The liquid electrophotographic ink of claim 1, wherein the third polymer is selected from the group consisting of copolymers of ethylene acrylic acid; copolymer of ethylene methacrylic acid; acid modified polyethylene low molecular weight polymers; maleic anhydride modified polyethylene; and mixtures thereof.

17. The liquid electrophotographic ink of claim 1, wherein the third polymer is a copolymer of ethylene acrylic acid.

18. The liquid electrophotographic ink of claim 1, wherein the first polymer is present in the ink from about 60 wt %/solids to about 90 wt %/solids, the second polymer is present in the ink from about 5 wt %/solids to about 30 wt %/solids, and the third polymer is present in the ink from about 5 wt %/solids to about 25 wt %/solids.

19. The liquid electrophotographic ink of claim 1, further comprising a charge director.

20. A method of manufacturing a liquid electrophotographic ink having improved durability, comprising
   a) forming a polymer blend by processing a carrier liquid and three distinct polymers, comprising:
      i) a first polymer having a melt flow rate of about 20 to about 70 g/10 min and a Vicat softening point of about 60° C. to about 70° C.,
      ii) a second polymer having a melt flow rate of about 80 to about 120 g/10 min, and
      iii) a third polymer having an acidity of about 160 to about 230 mg KOH/g and a melt flow rate of at least 500,
   b) processing the polymer blend with a pigment and charge director to form a the liquid electrophotographic ink,
   wherein the liquid electrophotographic ink is capable of being printed from a liquid electrophotographic printer.

21. The method of claim 20, wherein the polymer blend further comprises a wax that is incompatible with the polymer blend.

22. The method of claim 20, wherein the first polymer has an acidity of about 90 to about 130 mg KOH/g and the second polymer has an acidity of about 50 to about 80 mg KOH/g.

23. The method of claim 20, wherein the first polymer or the second polymer is a copolymer of ethylene and an ethylenically unsaturated acid of either acrylic or methacrylic acid.

24. The method of claim 20, wherein the third polymer has a melt viscosity lower than about 1000 cps.

25. A method of printing a liquid electrophotographic ink having improved durability, comprising printing the liquid electrophotographic ink of claim 1 on a substrate using a liquid electrophotographic printer.

26. The method of claim 25, wherein the substrate includes paper.

* * * * *

UNITED STATES PATENT AND TRADEMARK OFFICE
CERTIFICATE OF CORRECTION

PATENT NO. : 8,440,379 B2  
APPLICATION NO. : 12/997536  
DATED : May 14, 2013  
INVENTOR(S) : Stella Stolin Roditi et al.

Page 1 of 1

It is certified that error appears in the above-identified patent and that said Letters Patent is hereby corrected as shown below:

In the Claims

In column 14, line 59, in Claim 20, delete "a the" and insert -- a --, therefor.

Signed and Sealed this
First Day of October, 2013

Teresa Stanek Rea
*Deputy Director of the United States Patent and Trademark Office*